United States Patent [19]

Goldbach et al.

[11] 3,728,819
[45] Apr. 24, 1973

[54] VEHICLE DOORS

[75] Inventors: Horst Goldbach; Rudolf Brandenburg; Erich Dabringhausen, all of Heiligenhaus, Germany

[73] Assignee: Arn Kiekert & Sohne, Heiligenhaus, Germany

[22] Filed: Apr. 28, 1971

[21] Appl. No.: 138,032

[30] Foreign Application Priority Data

| Ap. 28, 1970 | Germany | P 20 20 576.9 |
| June 23, 1970 | Germany | P 20 30 799.7 |
| Aug. 29, 1970 | Germany | P 20 42 936.1 |
| Oct. 28, 1970 | Germany | P 20 52 764.4 |
| Dec. 21, 1970 | Germany | P 20 62 822.2 |
| Dec. 31, 1970 | Germany | P 20 64 678.0 |

[52] U.S. Cl. .....................49/216, 49/218, 49/223, 49/225
[51] Int. Cl. .............................................E05d 15/10
[58] Field of Search....................49/208, 209, 212, 49/215–225, 236, 254, 258, 259

[56] References Cited

FOREIGN PATENTS OR APPLICATIONS

| 847,916 | 8/1952 | Germany | 49/216 |
| 738,486 | 10/1955 | Great Britain | 49/216 |
| 698,436 | 11/1930 | France | 49/216 |

*Primary Examiner*—Kenneth Downey
*Attorney*—Spencer & Kaye

[57] ABSTRACT

A swinging, sliding door for vehicles, said door comprising at least one door panel, a guide track mounted on the panel, at least one roller guided in the track and a telescopic guide having at least two sections, one of the sections being mounted on the door panel and another of the sections being adapted to be mounted on the body of a vehicle by means of guide members. The telescopic guide extends essentially parallel to the upper edge of the door panel and the sections of the telescopic guide are arranged to move substantially parallel to each other on movement of the door.

10 Claims, 24 Drawing Figures

Patented April 24, 1973

INVENTORS:
HORST GOLDBACH
RUDOLF BRANDENBURG
ERICH DABRINGHAUSEN

BY: Spencer & Kaye
ATTORNEYS

Patented April 24, 1973  3,728,819

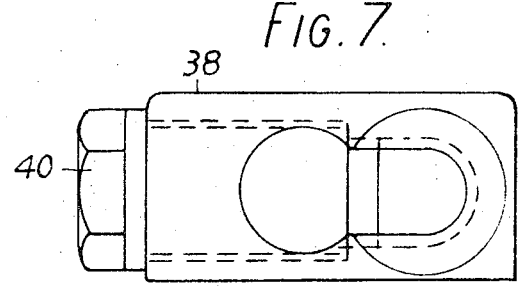
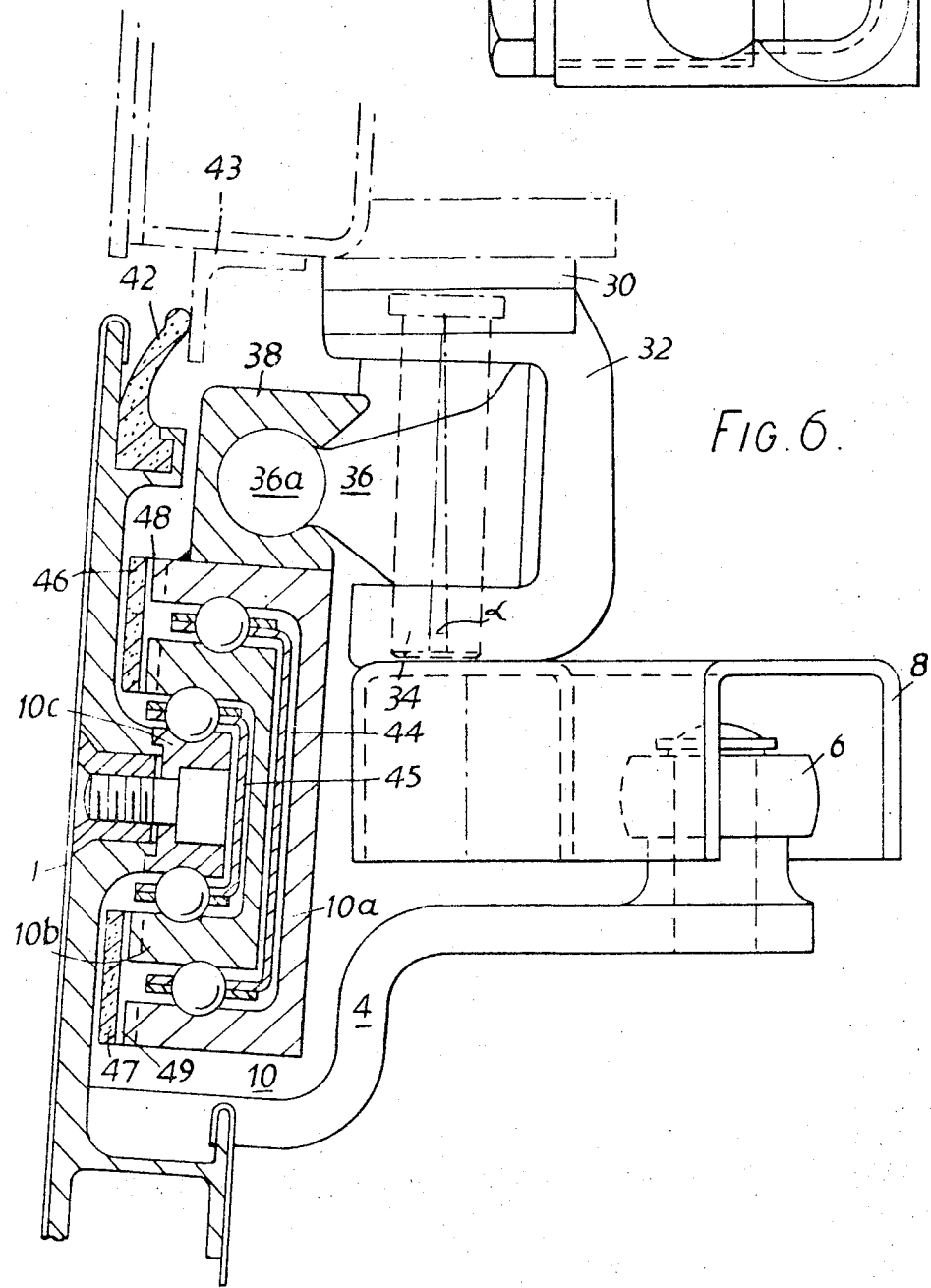

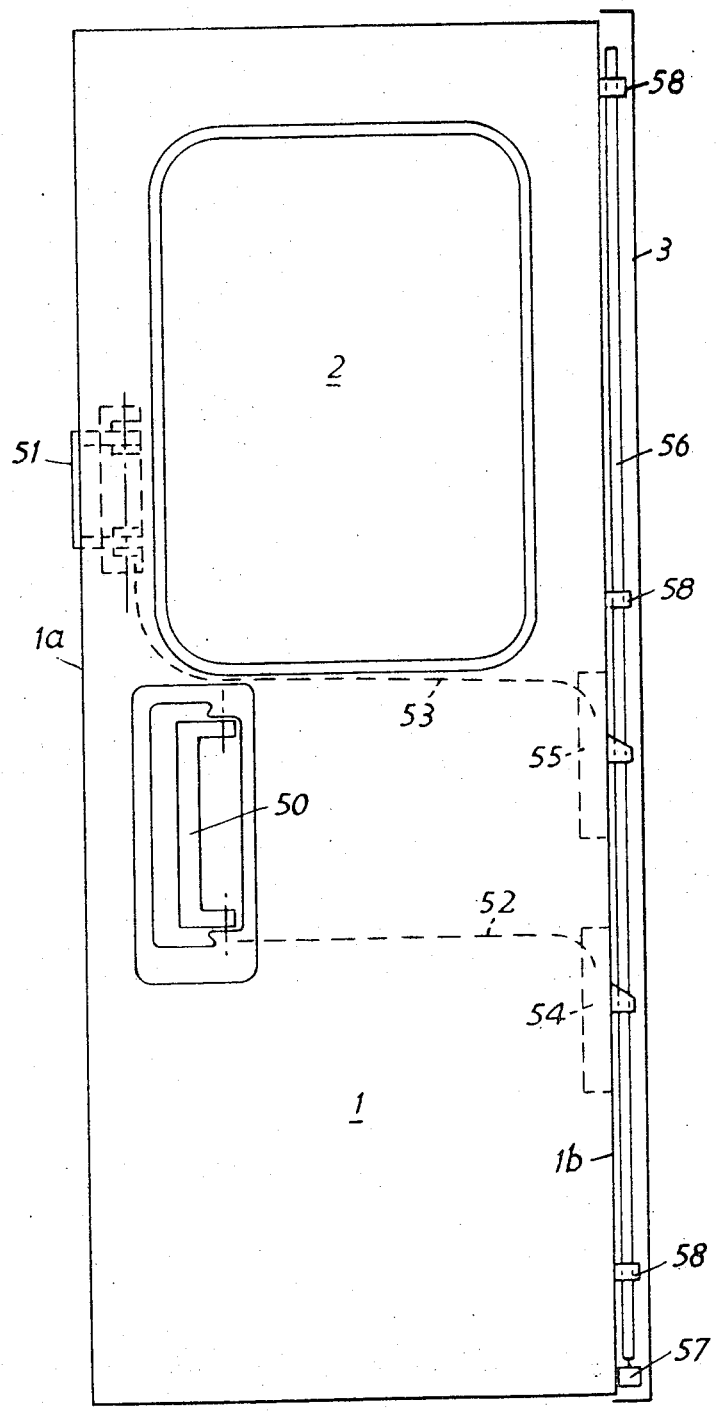

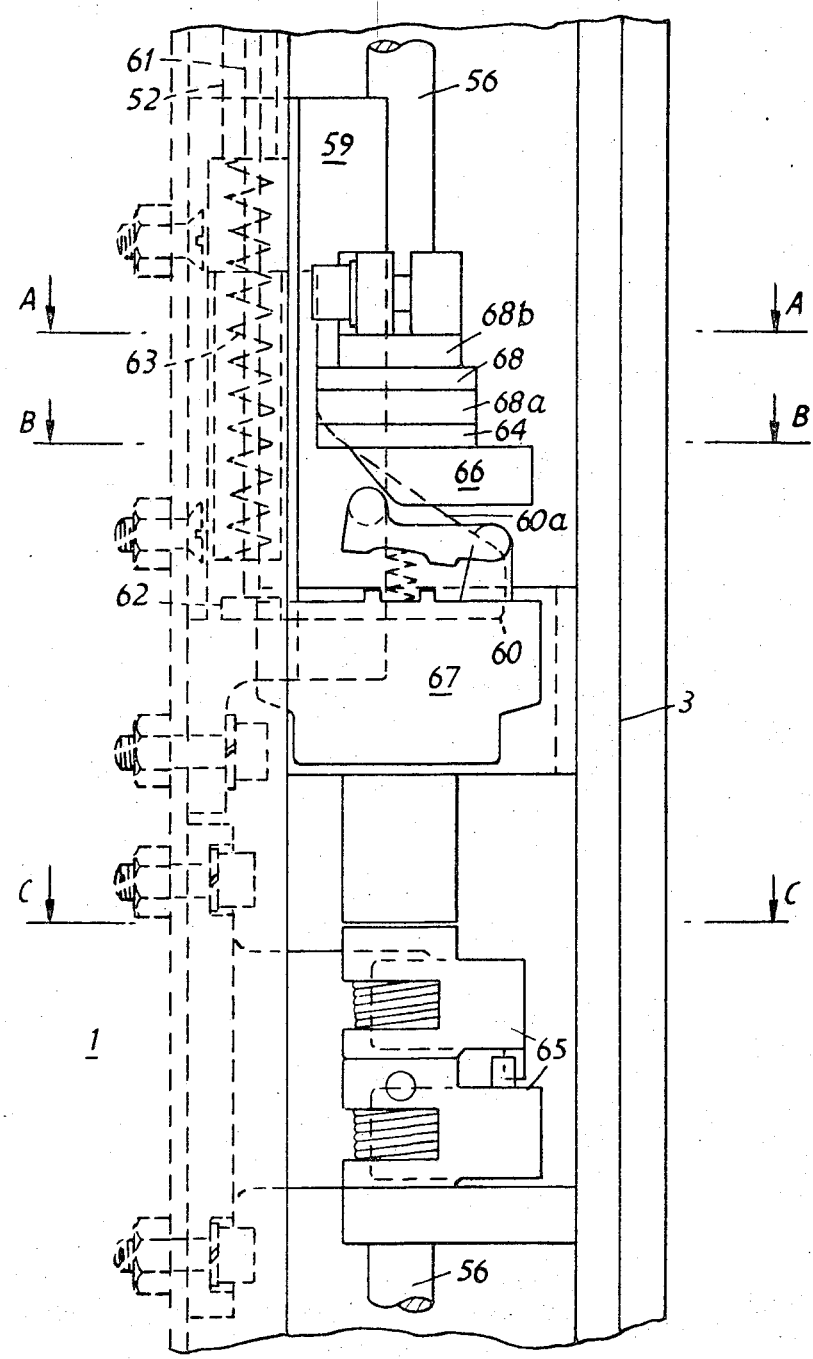

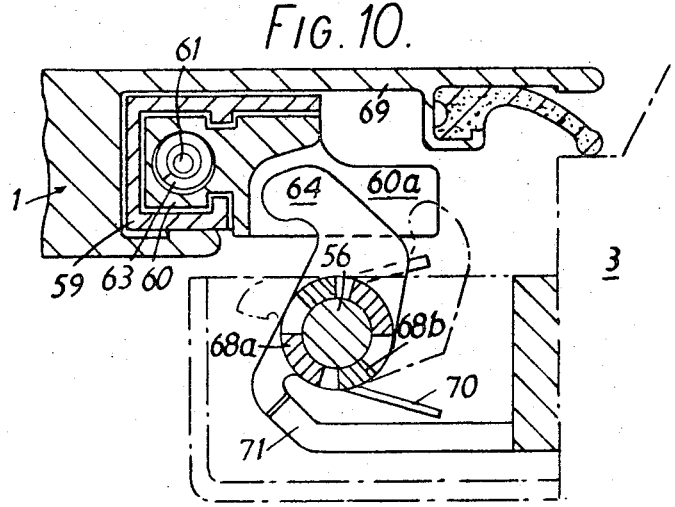
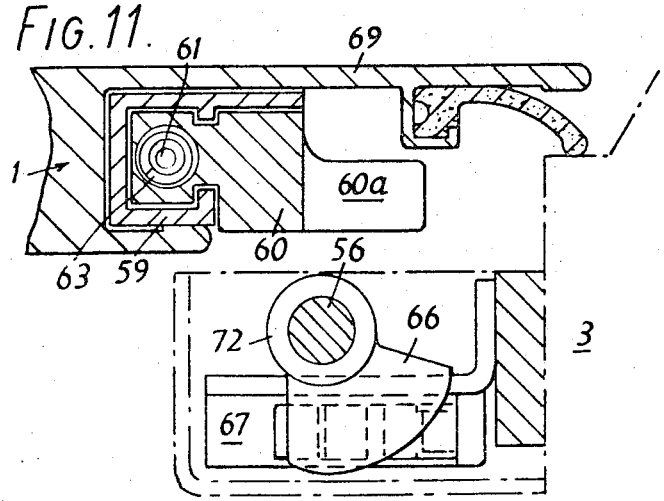
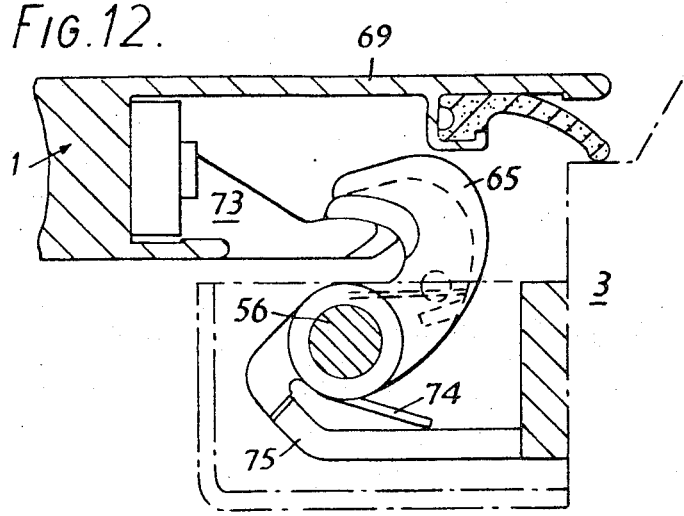

Patented April 24, 1973

VEHICLE DOORS

BACKGROUND OF THE INVENTION

The invention concerns a swinging, sliding door for vehicles which, during opening is initially swung out by means of rollers and runners from the body panel.

German Pat. No. 1,270,989 concerns a suspension device for vehicle door panels, the rear edge of which can be returned from the locking position initially around a vertical pin and then slid along the outer wall. Swinging levers attached to the door frame are provided for this, and are connected via hinge pins to roller wheels which can be slid and which are housed in bearings on the door panel. On the outside wall, curved guider tracks are fastened, in which the panel rests on rollers. To prevent tipping of the door, the hinge pins connecting the swinging lever with the roller wheels are joined to a through-shaft, on which, at a distance from each other, two pinions are fastened, which mate with racks fastened to the panel.

With the well known door construction, in the closed condition, the swinging lever is almost in alignment with the door surface. The result of this is that the door pushed in the direction of its plane must, in the last part of the locking phase, exert a great force in order to overcome the resistance forces occuring on the sealing profiles when the door panel swings into the body panel. Adjustment of the known swinging, sliding door is difficult and time-consuming because, in all, eight different and independent carrying, guide, bearing and stabilizing elements must be matched and adjusted, in order to meet finishing tolerances.

Austrian Patent No. 188,232 describes a swinging, sliding door for vehicles which, during the opening and closing movement, is moved by guide tracks diagonally to the sliding direction and swung around hinge or shackle parts. The guide means for the opening and shutting movement which runs diagonally to the door surface grip outside the shackle parts directly onto the guide parts connected to the door panel. Each shackle or hinge part consists of a knuckle or hinge connected to the door panel, a hanging strip fastened to the hinge or knuckle and rollers, which run in a stationary horizontal track. Two shackle parts are provided per door panel, which carry, via hinge joints, an extended horizontal arm or lever. This arm is fastened with one end to one edge of the door in such a way that when the door is opened it grips around the door pillar.

A disadvantage with this design is that with the arm reaching into the inside of the vehicle, additional space is required, which leads to a reduction of the boot area or the window surface area.

In addition, swinging, sliding doors have become known, which are not only guided through tracks above and below the door opening, but also require tracks laterally from the door opening, that is to say, on the external body wall. Such tracks are undesirable, for they lead to dirt and disturb the formation of the supporting construction of the body.

SUMMARY OF THE INVENTION

It is the object of this invention to simplify the known designs and improve them in such a way that all guiding and carrying elements can be installed in the immediate vicinity of the door opening.

A further object of the invention is to provide a swinging sliding door for vehicles, said door comprising at least one door panel, a track mounted on said panel, at least one roller guided in said track, and a telescopic guide consisting of at least two sections, one of said sections being mounted on said door panel and another of said sections being adapted to be mounted on the body of a vehicle by means of guide members, said telescopic guide extending essentially parallel to the upper edge of said door panel and the sections of said guide being arranged to move substantially parallel to each other on movement of said door.

According to a further object of the invention, the guide members comprise parallelogram guides having fixed swivel pins adapted to be connected to the body of a vehicle.

The fundamental progress in the new design is to be seen in the fact that all of the parts belonging to the operation of the door, both in the closed and open conditions, remain within the entry area, without affecting the entry surface area. With regard to the installation of the door, it is favorable that hardly any alterations to the bodywork are required. It is a simple matter to set the door in, since the functions of the guide vertically to the body surface and the weight transference to the body are clearly separated. In addition can also be suited without further ado to the door area of curved bodies.

A further object of the invention is to improve the previously described door design with regard to their kinematics in the first phase of the opening process and the last phase of the closing process.

This is achieved in that the stationary swivel pins are sloped outwards slightly in relation to the vertical ones, that the guide assigned to the front edge of the door is longer than the guide assigned to the rear edge of the door and that the vertical distance between the connection line of the stationary swivel pins and that of the swingable swivel pins assigned to the front edge of the door is greater than the corresponding distance of the swingable swivel pins assigned to the rear edge of the door.

Further, the parallelogram-guides may each be provided at their end, which describes the circle, with a ball end, which each rest in a ball/socket attached to the top side of the telescopic guide.

A further object of the invention is to develop an especially safe, versatile, and yet at the same time simple locking system for swinging sliding doors, which will give the operating staff the possibility of putting the inside and outside handle of the door out of action separately.

Modern road and rail vehicles for passenger traffic, are fitted to an increasing extent with swinging, sliding doors, which, in contrast to hinged doors, or simple sliding doors must be locked at the rear edge. The operating handles are, however, fitted to the front edge of the door in the usual manner. Solutions have already been known which provide connecting rods between the door handle and the locking system on the rear edge of the door. If the inside and outside handles are not coupled together, two such connecting rods must be housed in or on the door panel.

Such designs no longer satisfy modern safety requirements. The various instructions for the individual traffic systems or traffic carriers, specify in part that unlocking can be prevented by the train or vehicle driver, whereby this prevention operates on the inside door handle, the outside door handle, or on both. The purpose of these specifications should be clarified by a few examples:

Since, on reaching a stopping point, only those doors at which passengers wish to get on or off should be opened, it must be possible to open the doors from the outside and from the inside.

On many road vehicles and omnibuses, only the driver's door or the door where the conductor stands should be used for getting in. On all the other doors therefore, it must be possible to put the outside handle out of operation.

Doors with compressed air drive are also individually opened according to requirement, but jointly closed by the conductor, passenger or train driver.

Before stopping and after starting off, all doors should be locked in such a way that they cannot be operated by the passenger.

Another variant is based on an arrangement in which a train driver after starting off can remove the prevention of operation of the outside handle of a particular door, in order to allow the second man to jump on.

The new type of locking system must be in a position to materialize the requirements listed in any combination.

This is achieved in that the handles fitted to the inside and outside of the door panel each operate on a control unit attached to the rear edge of the door through Bowden cables or the like, that a vertical shaft is housed in bearings on the rear door pillar, is provided with locking bolts and can be stopped by an electro magnet, that each control unit, when the door is closed, is connected to the shaft through a cam and that a further cam, in its first movement phase, operate a contact lying in a current circuit of the electro magnet.

Through the use of two contacts in separate circuits of the electro magnet, not only can the shaft fitted with locking bolts be separately operated through the inside and outside handle, but the possibility also exists of selectively preventing the release of the shaft by further contacts or switches in series.

Yet another object of the invention is to cover the parts of the telescopic guide when the door is open and protect them against rain and dirt.

A further development of the invention provides that at the top edge of the door panel, a pocket-shaped hollow section should be fitted, that the inside flank of the hollow section should be connected to the inside profile of the telescopic guide and that to the top flank of the outside profile of the telescopic guide a masking or covering skirt should be attached, projecting into the pocket-shaped hollow section.

Hydraulic or pneumatic drives for swinging, sliding doors of vehicles are known. They consist of a cylinder which can be stressed on both sides, the piston rod of which executes a stroke corresponding to the width of the door. At the same time the horizontally arranged cylinder is connected via a hinge joint to the door. Basically, the drive can be so arranged that the piston rod, when the door is closed, is inside the cylinder or out of it. The latter solution has the disadvantage that the guide barrel of the cylinder is subjected to the constant vibrations and accelerations during travel and suffers heavy wear. In addition the piston rod must be made relatively resistant to bending.

With unilateral swinging, sliding doors, the cylinder can be installed either left or right of the door opening in the body. Only in the case of special door designs is it possible to instal the cylinder above the door opening.

With double-sided swinging, sliding doors, each door panel is moved by its own drive unit. If the cylinder operating the left hand door panel is installed above the right hand door panel and vice-versa, then the piston rods can be inside the cylinders when the doors are closed. In any case, the drive units must be offset from each other, in height, so that they do not hinder each other.

However, in all these solutions described, the drive unit must extend more or less into the body work space, sideways from the door opening, because the construction length of such a drive unit is essentially larger than its stroke and therefore larger than the width of the door.

Shorter construction lengths can be achieved with multi-telescopic cylinders. These are, however, very expensive. In addition, in the case of most door designs, they must also be installed in the bodywork spaced sideways from the door opening, which brings about a greater expenditure for assembly and maintenance.

What is striven for, is a drive system which, on both single and double side swinging, sliding doors can be installed in the smallest amount of space above the door, without affecting in any way, the optimum formation of the door pillar or roof support. The last mentioned requirement is especially important, because modern public service vehicles have large window areas in the side walls and in the area of transition to the roof. The installation of the drive parts in the space sideways from the door opening is therefore undesirable for reasons of statics and shaping.

Yet another object of the invention is to provide a drive system for swinging sliding doors which includes a pressure medium cylinder extending substantially parallel to the direction of sliding of said door, a rack connected to the piston rod of the cylinder, a gear wheel arranged to be driven by the rack, a tension medium wheel secured to the gear wheel and having a larger diameter than the gear wheel, and a tension medium running over said wheel and over guide rollers and being connected to the door.

Surprising success is achieved with these measures in managing with a very short, light and cheap pressure cylinder, which, together with the other parts of the drive system can be attached, as a pre-mounted unit, in the space above the door opening.

In the case of certain particular vehicles, it is difficult to instal the bottom guide track of a swinging, sliding door in the bottom of the vehicle or on an entry step. This is especially the case where what are called swivel steps are used in order to match the varying platform heights. In the case of underground railway vehicles, it is a requirement that the height of the bottom or floor of the vehicle lie almost at the same level as the platform. Since the bottom edge of the door, in the case of swinging, sliding doors, must frequently be higher than the edge of the platform, there remains very little height for the installation of a guide track in the vicinity of the floor.

It is, therefore, a further object of this invention to so improve the described swinging, sliding door design, that at least the bottom guide track in the bodywork can be dispensed with. In this way the matching of the door construction to different body and vehicle shapes should be decisively facilitated.

Accordingly, a guide track may be fitted to the door panel extending across the width of the door and curved around a vertical pin at one end, on the door pillar around which the door travels, a lever may be housed in such a way as to be rotatable to a limited extent around a vertical pin, two guide rollers rotatable about vertical pins being provided on the lever and the guide track being arranged to run between these guide rollers, the shortest interval between the sliding surfaces of the guide rollers being greater than the thickness of the guide track in the straight area, and the thickness of the guide track in the curved area increasing up to the shortest distance between the sliding surfaces of the guide rollers.

In the case of swinging, sliding doors, a catch device is necessary which, in the last part of the closing phase, catches the inner edge of the door panel on swinging into the body panel, and holds it so that the door panel does not vibrate, even in the event of compressed air fluctuations, such as can occur when vehicles pass each other or travel through tunnels. Such a catch device must be made in such a way, that in the case of double-sided swinging, sliding doors, which indeed have no door pillar in the plane of symmetry, it can be inconspicuously installed in the area of the entry step and/or in the body area above the door opening.

A still further object of the invention provides that on the floor support under the door and/or the bodywork support above the door, a supporting body is fitted for an adjustable short projection which operates jointly with a door key or wedge attached to the inside edge of the door.

BRIEF DESCRIPTION OF THE DRAWINGS

The invention will now be further described, by way of example, with reference to the accompanying drawings, in which:

FIG. 6 is a section through the telescopic guide and a parallelogram-guide with universal joint shown in FIG. 5;

FIG. 7 is a side elevation of a ball socket for use with the door shown in FIGS. 5 and 6;

FIG. 8 is a view of a further embodiment of a door according to the invention with a locking device;

FIG. 9 shows a detail of a control unit with a part of the shaft for use with the door shown in FIG. 8;

FIG. 10 is a section on the line A—A in FIG. 9;

FIG. 11 is a section on the line B—B in FIG. 9;

FIG. 12 is a section on the line C-C in FIG. 9;

In the drawings, like parts are denoted by like reference numerals.

DESCRIPTION OF PREFERRED EMBODIMENTS

Figure 1:
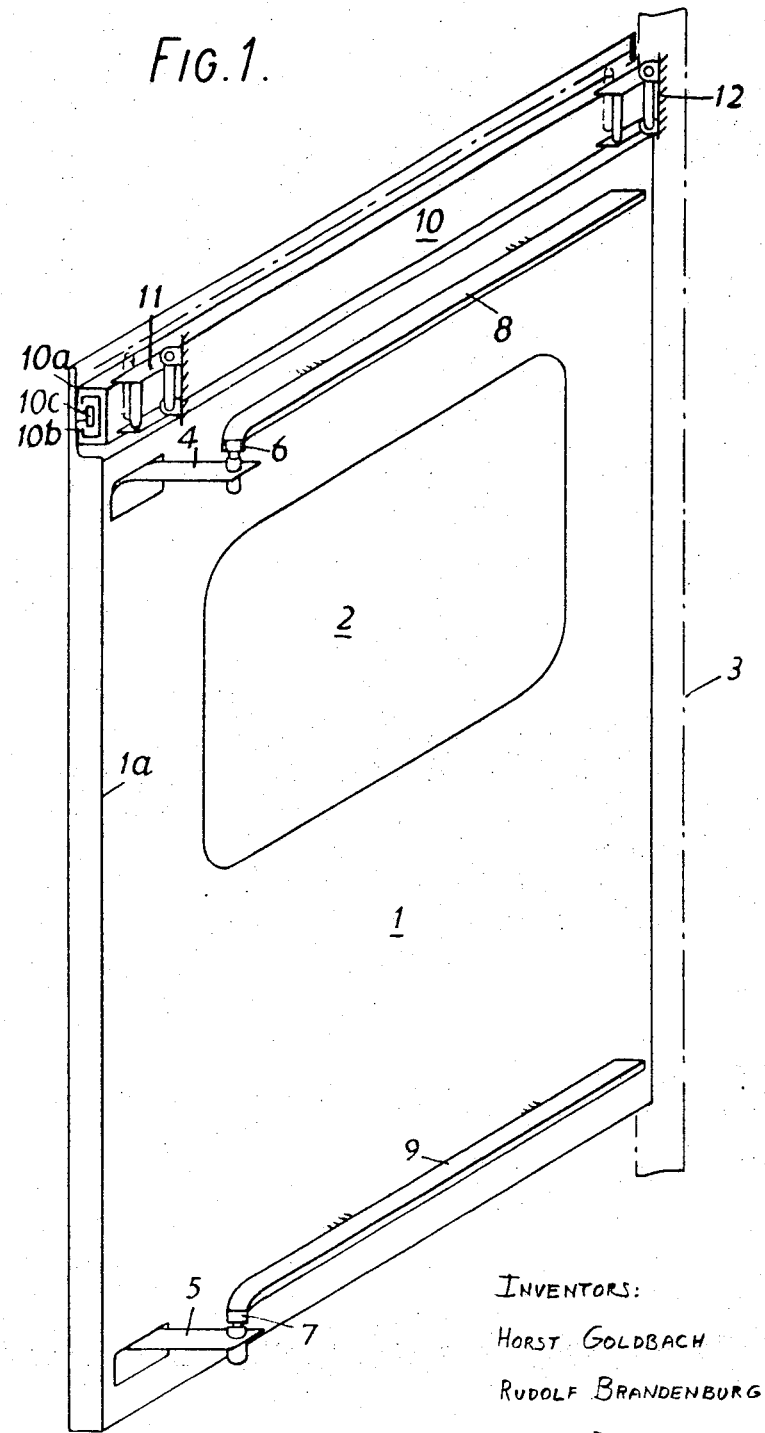
FIGS. 1 and 2 are perspective views of one embodiment of a door according to the invention showing the door respectively in closed and half-open positions.

Reference will first be made to FIG. 1 of the drawings which shows a door 1 in which a window 2 is inserted. The right hand boundary of the door opening is represented by the body wall 3. In the vicinity of the left hand door edge 1a, angles 4 and 5 are connected top and bottom with the door panel, which carry guide rollers 6 and 7. These rollers run in stationary, curved guide tracks 8 and 9. Both tracks consist of a U-profile fitted downwards with the opening, which is curved towards the interior of the vehicle at the left hand end. Guide track 8 is attached above the door opening to the body or roof construction (not shown). Guide track 9 can be attached to the underside of a step or the vehicle body. A three-part telescopic guide 10 having an external profile 10a is mounted on the body via parallelogram-guides 11, 12, so that it can be swung. The center profile of the guide 10 is indicated at 10b, and the internal profile at 10c. The latter is attached to the door construction.

Each guide consists of a stationary bearing plate which is also connected to external profile 10a, two vertical hinge pins and a top and bottom guide arm. When the door is completely closed, the guide arms in the case of the example chosen, lie parallel to the door surface. When the door opening process begins, the door panel 1 including the telescopic guide 10 is initially swung out of the body surface parallel to itself, until the guide arms take up the position indicated by broken lines in FIG. 2. The swingable hinge pins of the parallelogram-guides 11 and 12 move outwards during this on a circle. At the same time, the swinging movement is brought about through the curvature of the guide tracks 8 and 9. The radius of curvature and the length of the curved track sections determine in connection with the length of the guide arms the angle of swinging and the distance of the door panel from the body surface. The extent of this distance is chosen so that the door, on being opened further, can be pushed unhindered in front of the external body wall. At the same time the weight of the door is taken up exclusively by the telescopic guide 10 and transferred through the parallelogram-guides 11, 12 to the body.

The telescopic guide 10 is mounted in a cut-out, offset at right angles on the top door edge, in such a way that the center profile 10b does not project or only projects very slightly out of the surface of the inside door panel. As a result of this, the distance between body surface and swung-out door can be kept very small.

Figure 2:
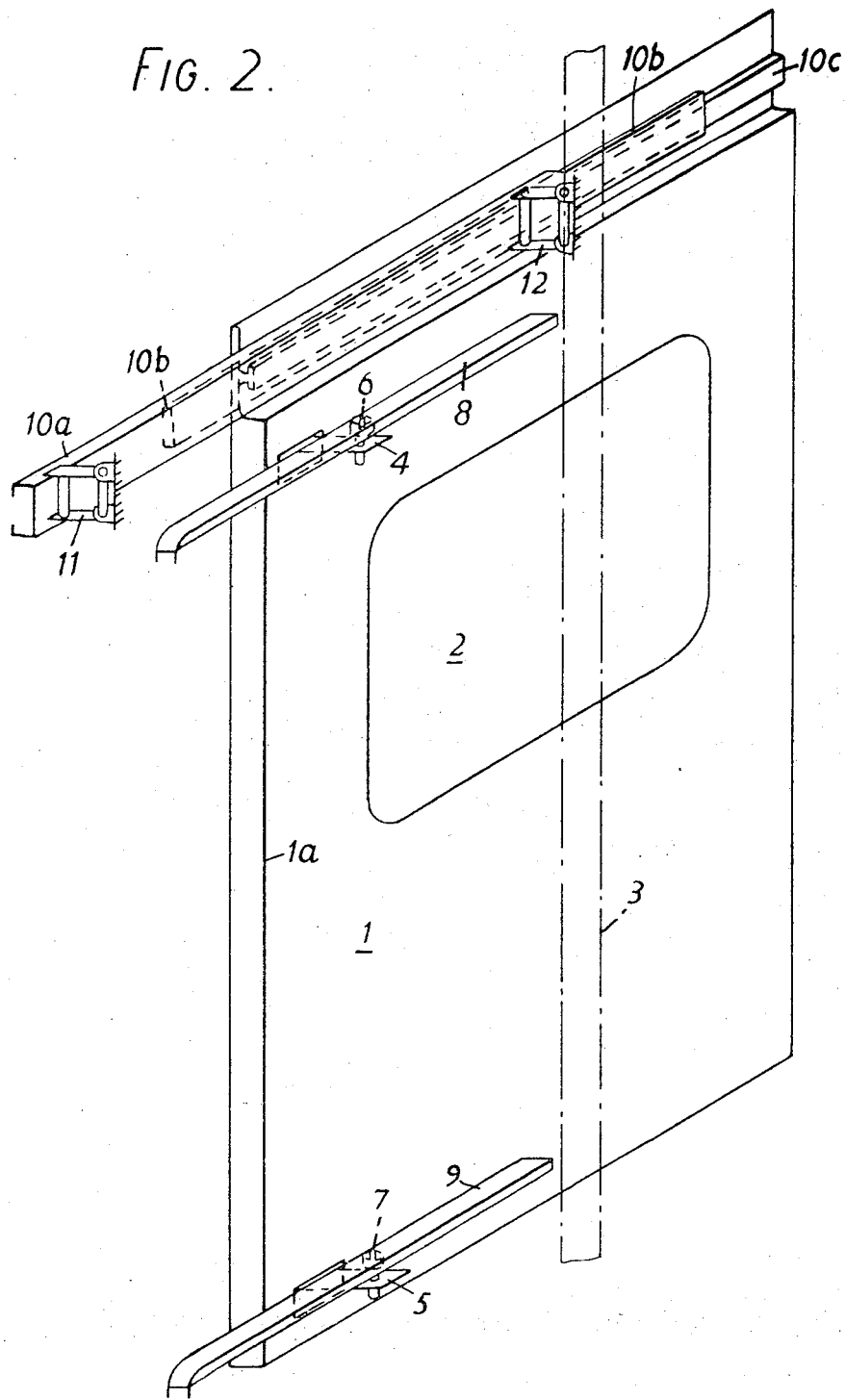

FIG. 2 shows the door in the half-opened condition. 3 again indicates the right hand body wall. The illustration clearly shows the swung-out external profile 10a of the telescopic guide and the partially drawn-out center and internal profiles 10b and 10c.

The length of the telescopic guide corresponds approximately to the width of the door. Stops or traction cables make sure that the internal profiles are only drawn out halfway whenever the door is completely opened. By this means the occurrence of undue stresses in the telescope guide are prevented.

By means of a second symmetrical unit, the illustrated design can be extended to a double door. Door drive systems, preferably compressed air cylinders, can be installed in the vicinity of the door top edge. They can be masked by means of cladding, together with the top guide track 8, the telescopic guide 10 and the parallelogram-guides 11 and 12.

At the same time, it is advisable for the purpose of optimum utilization of internal space to move guide track 8 and angle 4 as far upwards as possible, so that these tracks can be brought together in one assembly unit with the stationary bearing plates of the parallelogram-guides 11 and 12.

The telescopic guide 10 can consist of a CCO-profile combination with a coating or lining of polytetrafluoroethylene to reduce friction. At least equally suitable is a ball bearing track guide, as illustrated in vertical section in FIG. 3. 10a indicates the outside profile, 10b, the center, and 10c the inside profile. Between the outer and center profile run two series of bearings 13, 14. Between the center and inside profile bearings 15, 16 are arranged. The bearings run in grooves in the profiles and are mounted in special bearing cages 17, 18, 19 and 20. These cages are formed in such a way that when the guide is drawn out, the bearings cannot fall out. The inside profile 10c is fastened to the door panel 1, by means of a counter sunk screw 21. A hinge pin 22 of the parallelogram-guide is connected to the top side of profile 10a. A guide arm 23, drawn in severed form, leads to the fixed hinge pin (not shown). The top limit of the door opening is indicated at 24.

Figure 4:
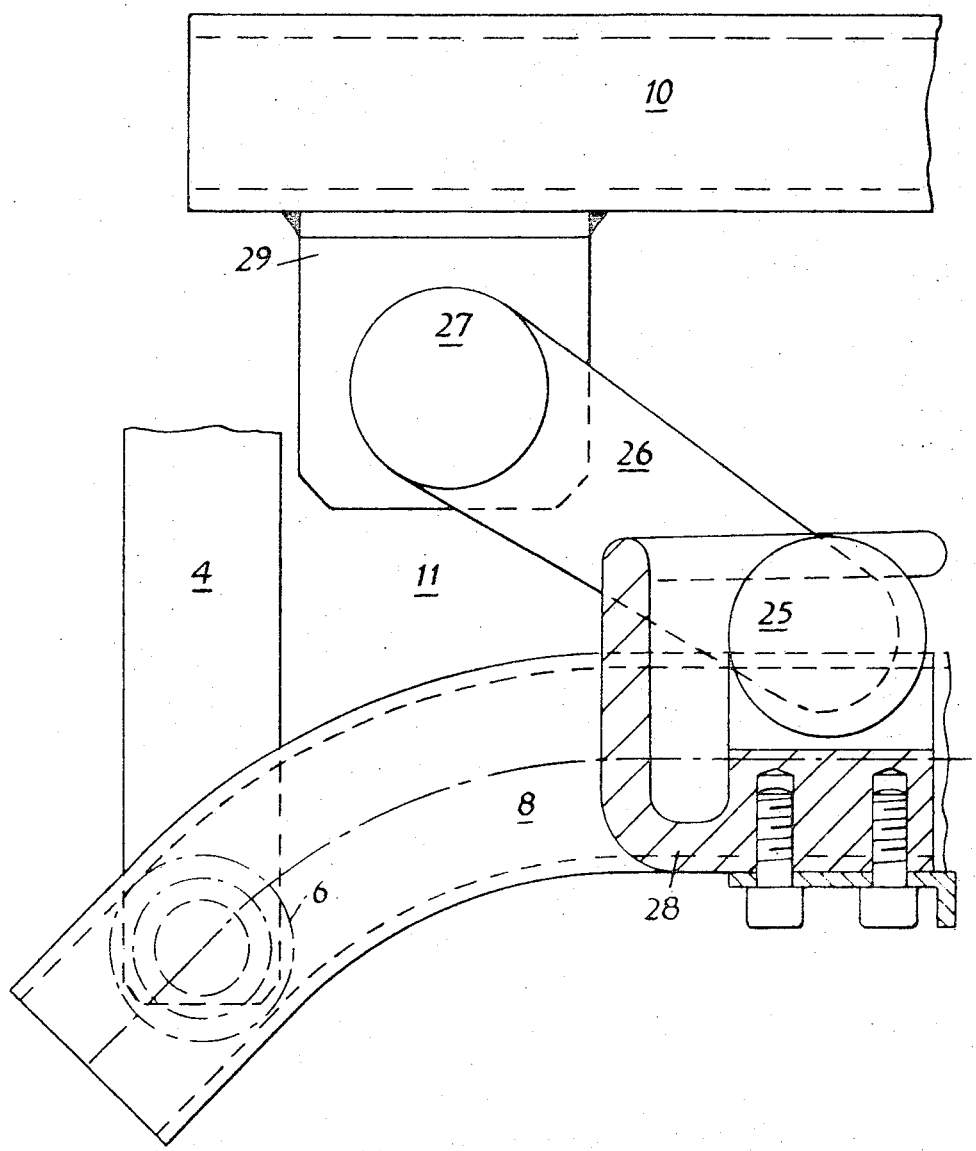
FIG. 4 is a detailed plan view of the curved end of a top guide track and parallelogram-guide for use with the door shown in FIGS. 1 and 2.

FIG. 4 shows a plan view of the curved end of the guide track 8 and parallelogram-guide 11. The latter consists of a hinge pin 25, guide arm 26, hinge pin 27, bearing plate 28 which is connected with track 8 and a bearing plate 29 which is attached to the telescopic guide 10.

Figure 3:
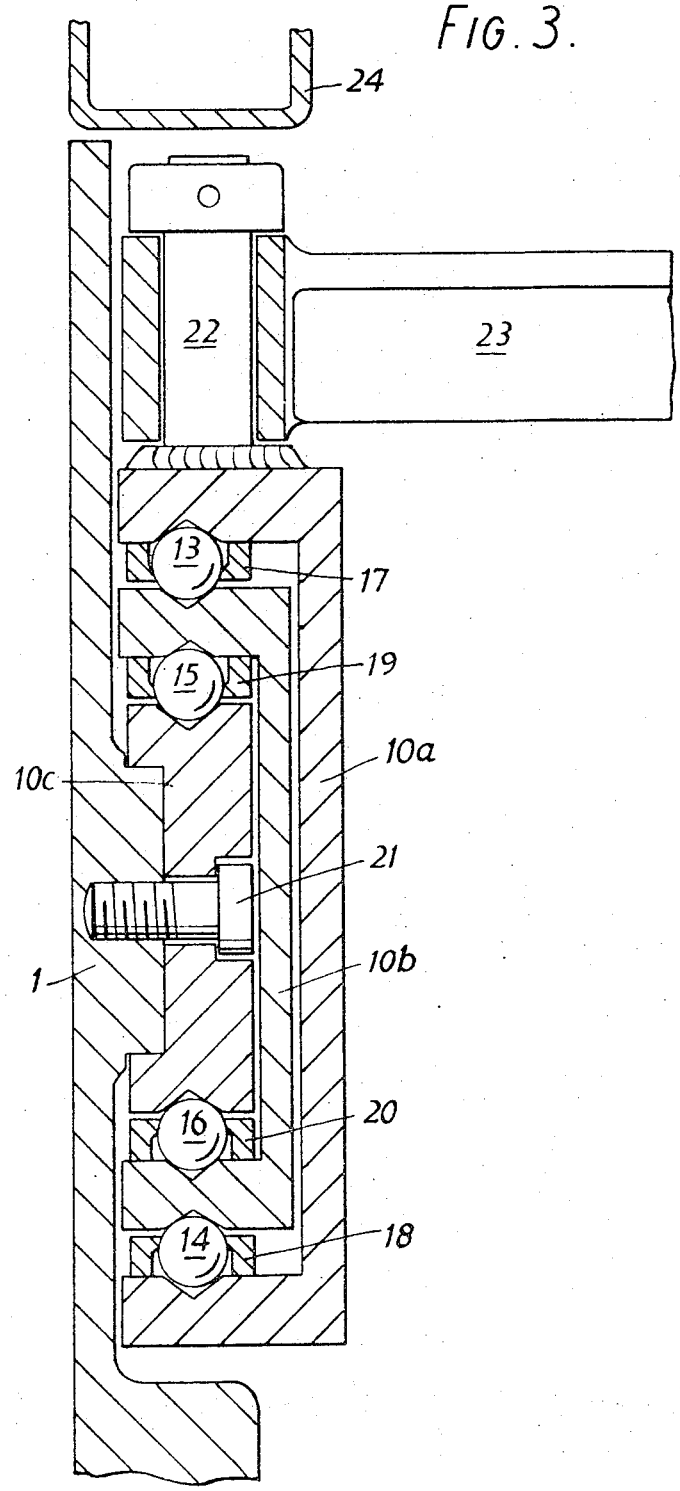
FIG. 3 is a vertical section through a telescopic guide for use with the door shown in FIGS. 1 and 2.

A comparison of FIGS. 3 and 4 shows, that the hinge pins can be put either on or in front of the outside profile 10a of the telescopic guide. In the first case, a greater construction height is obtained, in the second a greater construction depth. Mostly the second solution is preferred, because then the inside cladding can be positioned higher and the window height increased.

This invention is in no way limited to the illustrated construction. So, for instance, instead of parallelogram-guides, swallowtail guides can be used, the direction of movement of which stands vertically on the door surface, or forms an acute angle with the main direction of movement of the door. It would also be possible to mount the telescopic guide on a stationary, vertical rod by means of hinge joint arms. If using a swallowtail version, it can be expedient to equip these with a small ancillary drive, which facilitates swinging out when the door is opened and gives an especially good seal when the door is closed. Within the framework of the invention, the telescopic guide could also be mounted on the lower part of the door. In addition, the inside profile could be attached to the parallelogram-guides and the outside to the door panel. The preferred form chosen, offers however, both static, kinematic and spatial advantages.

If the door panel, which is practically held at the top side and the bottom left hand corner should tend to swing, whilst travelling, then the bottom right hand corner can be held by means of a retaining device effective when the door is closed.

Figure 5:
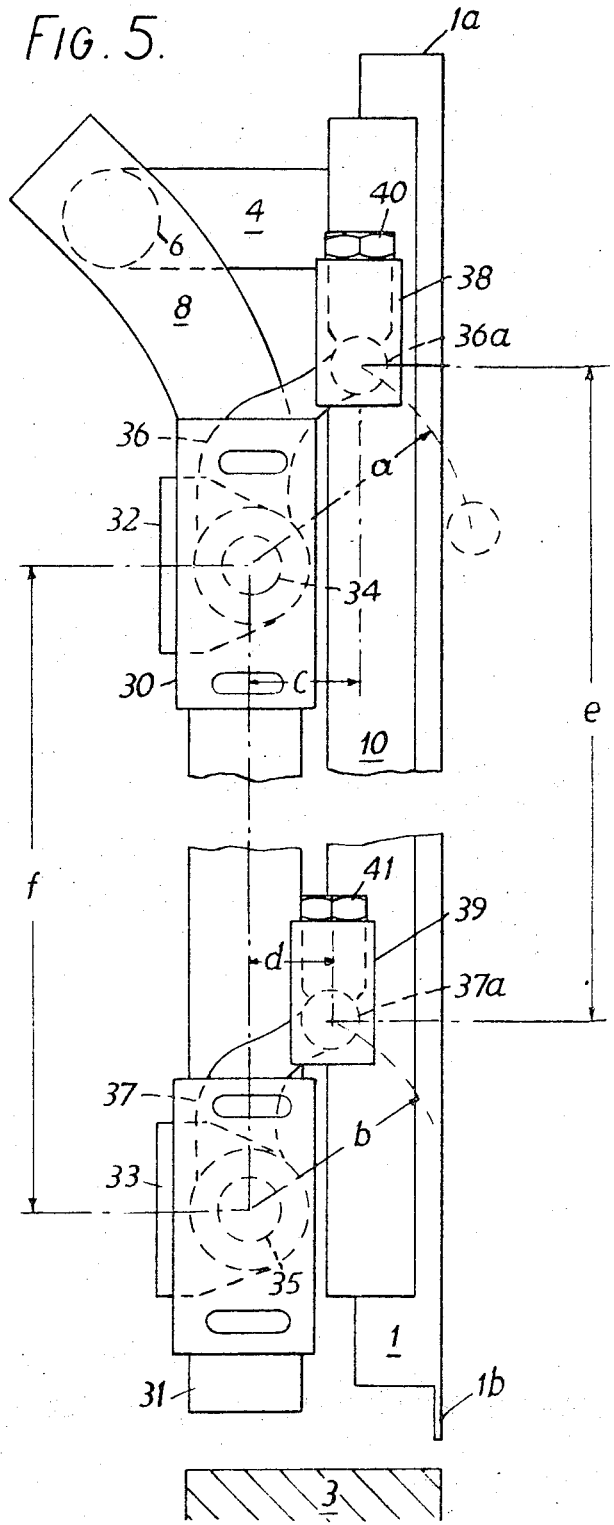
FIG. 5 is a view of a second embodiment of a door according to the invention taken from above, in the closed condition.

Reference will now be made to FIG. 5 5 of the drawings, in which the telescopic guide 10 is let into the door panel 1 in such a way that it projects only very slightly. The front edge of the door panel is again indicated at 1a and the rear edge at 16.

The door panel can be rounded off on the four corners in such a way that a circular sealing profile shown in FIG. 5 can be used.

The guide track 8 which is open downwards is curved at one end and is attached to bearing brackets 32 and 33 which are connected with plates 30 and 31. The plates 30, 31 are screwed to the bodywork. Slots are provided to serve for adjustments. Stationary swivel pins 34 and 35 rest respectively in bearing brackets 32, 33 on which curved parallelogram-guides 36 and 37 are supported in bearings so that they can be swivelled. The guides are each provided at their ends which described a circular movement with a ball and 36a and 37a, which rest in respective ball sockets 38 and 39 which are attached to the top side of the telescopic guide 10.

Guide track 8 and parts 30 – 37 of the parallelogram-guide form an initial pre-mountable assembly. The second assembly is given by the door panel 1, the telescopic guide 10 and ball sockets 38 and 39. To facilitate installation of the door in the vehicle equipped with the first assembly, the ball sockets 38 and 39 are formed in such a way that the guides 36 and 37 can be put easily with the ball ends 36a and 37a in the sockets. For this purpose the square-shaped ball sockets are provided with a hole and a lateral cut-out, as can be seen from FIG. 7. After the door has been hung, screws 40 and 41 are screwed into the respective holes and hold the ball ends in their bearing position. If when installing the door, the introduction of the guide rollers into the guider tracks gives difficulties, then the guide rollers can be subsequently mounted with socket bolts.

When the door is open, door panel 1 is initially swung out on a circular path from the body surface, before the telescopic guide starts to operate. At the same time, the rear edge 16 of the door, should be moved on a path which is as steep as possible, so that it comes free from body wall 3 in relation to the sealing profile which is not illustrated, as quickly as possible. A quite fundamental criterion for achieving this, lies in the fact that the guide 36 corresponding to the front edge 1a of the door is longer than the guide 37 corresponding to the rear edge 1b of the door. In other words, the radius of swing $a$ is greater than the radius of swing $b$. In addition, the vertical distance $c$ between the connection line of the stationary swivel pins 34 and 35 and that of the swivel pin corresponding to the front edge of the door (ball end center point) is greater than the corresponding distance $d$ of the swivel pin (ball end center point) corresponding to the rear edge of the door. From these details it follows that the distance $e$ between the swingable pins or ball ends is also greater than the distance $f$ between the fixed swivel pins 34 and 35.

FIG. 6 shows a circular sealing profile 42 which rests against a stationary angle guide 43. As shown in FIG. 6, the telescopic guide 10 consists of an external U-profile 10a, a center U-profile 10b and an internal I-profile 10c, which is screwed to the door panel. Laterally staggered ball spunts have been made in the profiles. The bearings are held in cages 44 and 45.

Since the three-part telescopic guide which has been described, is loaded with the full weight of the door in the open condition, it must be able to transfer the occurring moment. For this purpose it is necessary that the related movement of the individual telescopic profiles be mutually limited. On the open side of the telescopic guide, stops have therefore been so fitted, that, for example, when the door is opened, the inside profile 10c is withdrawn up to 50 percent out of the center profile 10b and the latter up to 50 percent out of the outside profile 10a. At the same time it is unimportant whether, during opening or shutting of the door, both relative movements take place simultaneously or successively. 46 and 47 indicate stop brackets, which are screwed to the center profile 10b and come to rest against angles 48 and 49 on the outside profile. To achieve a damping effect the stop parts can be fitted with a plastic lining. The stops between the inside profile 10c and the center profile 10b are not illustrated here, since they lie on another surface.

Bearing bracket 32 is formed in such a way that guide track 8, if necessary, can also be attached to its right hand side.

The closing of the door is facilitated by the fact that pin 34 is sloped outwards from the vertical around the angle $\alpha$. A slope of preferably 4° leads straightaway to ball end 36a and with it the door panel running on a circular path sloped towards the horizontal, so that in the final phase of the locking process, the swinging force contributes to the closing movement.

It should moreover, be noted that the door panel surface may deviate from the vertical according to the shape of the body, especially since the door panel may be a single or biaxially curved surface area.

FIG. 7 shows a ball socket, for example 38, from the side. In the side wall, a keyhole type cut-out is made, into which the ball end is introduced and pushed towards the right into the final position. In this position, the ball end is held by screw 40 in such a way that it can carry out the necessary swinging movements.

The use of ball and socket joints in the parallelogram-guide has the great advantage that during manufacture of the door and the installation points on the bodywork, greater tolerances are permissible.

If, for the "approximate parallelogram-guide" values of about $a = 1.2b$ and $c = 1.5d$ are chosen, then the curvature of the guide tracks can be kept small. This gives the following advantages:

1. Flatter convergence of the front and steeper convergence of the rear edges of the door.
2. Slighter loading of forces on the curved guide track area through the drive system.
3. Slighter influence of the play between guide tracks and guide rollers.
4. Quieter and smoother movement of the door.

For the stressing of the individual construction parts, it is further favorable, if the ball and socket joints lie as far as possible vertically across the ball spunts, of the telescopic guide and the latter is arranged over the center of gravity of the door.

FIG. 8 shows a door panel on the front edge 1a of which an outside door handle 50 and an inside door handle 51 are fitted. The inside door handle 51 is, on account of the difference in level, arranged in a higher position than the outside handle. From these door handles, Bowden cable 52 and 53 lead to control units 54 and 55, which are installed in the door panel at the right hand, rear edge 1b, of the door.

On the body wall 3, which is preferably made out of a hollow section, a vertical shaft 56 is housed, so as to be rotatable. The bottom end of this shaft is connected to an electro-magnet 57 which is used for stopping. Individual locking bolts 58 are mounted at different heights.

FIG. 9 shows the bottoms of the two control units 54, with a part of shaft 56. An essential component of the control unit is a base plate 59, on which a cam carrier 60 is housed so as to be vertically adjustable. The traction cable 61 of the Bowden cable 52 is attached to the cam carrier 60 through a disc 62. When the Bowden cable is operated, a wedge surface 60a of the cam carrier is moved against the force of a spiral spring 63 in the direction of the arrow. This translation movement is converted into a rotary movement through a cam 64 which is housed so as to be rotatable on shaft 56.

A further cam 66 connected with cam 64 operates, in the initial phase its rotary movement on a stationary contact 67 and locks this within a relatively small angle of rotation. In addition cam 64 is connected to the bottom part 68a of a spur gear coupling, the top part 68b of which is clamped to shaft 56. This coupling or clutch makes possible a relative rotation between cam and shaft around an angle, which is greater than the angle for the locking or closing of contact 67. Shaft 56 is held, by spiral springs which are not illustrated, in a starting position, in which a locking bolt 65 is locked.

If cam 60, with the door closed, is moved out of its resting position upwards, it turns cam 64. The cam 66 closes contact 67 which is in series connection with a control switch (not shown) in a circuit of the stopping electro-magnet 57 (FIG. 8). If the control switch is closed, then the coil of electro-magnet is made live on closure of contact 67 and shaft 56 unlocked. If then, on further turning of cam 64 the spur gear coupling engages, shaft 56 is taken along and locking bolt 65 is opened. If, on the other hand, the control switch is open, then electro magnet 57 remains without current and shaft 56 stops. In this case, the door cannot be opened.

Since two separate circuits each with a contact and a control switch can be manufactured for the outside and inside operating systems, the operation of all doors from the outside and/or the inside can be prevented from a central position. Any other programmes for the opening and shutting of the doors are possible.

FIG. 10 shows the insertion of the base plate 59 in an edge panel 69 of the door panel 1. Cam 60 is led into this base plate through a swallowtail profile. Cam 64 slides on the wedge surface 60a of this cam, and is pressed by a spring 70 against a stationary stop 71. After the raising of the cam 60, cam 64 takes up the position indicated by the dot-dash line.

FIG. 11 shows the configuration of the cam 66 which is connected to cam 64 (FIG. 10) through a bushing 72. Cam 66 operates the contact or switch 67.

FIG. 12 shows the configuration of the two-part locking bolt 65 which operates with pre-locking device and main locking device. The locking bolt 65 grips across a bolt catch 73 connected to the edge panel 69 of door panel 1.

Locking bolt 65 is pressed by a spring 74 against a stop 75. In the position illustrated, the door is bolted. To unlock, shaft 56 is turned anticlockwise. During closing of the door, bolt catch 73 presses locking bolt 65 to the side against the force of spring 74.

Figure 13:
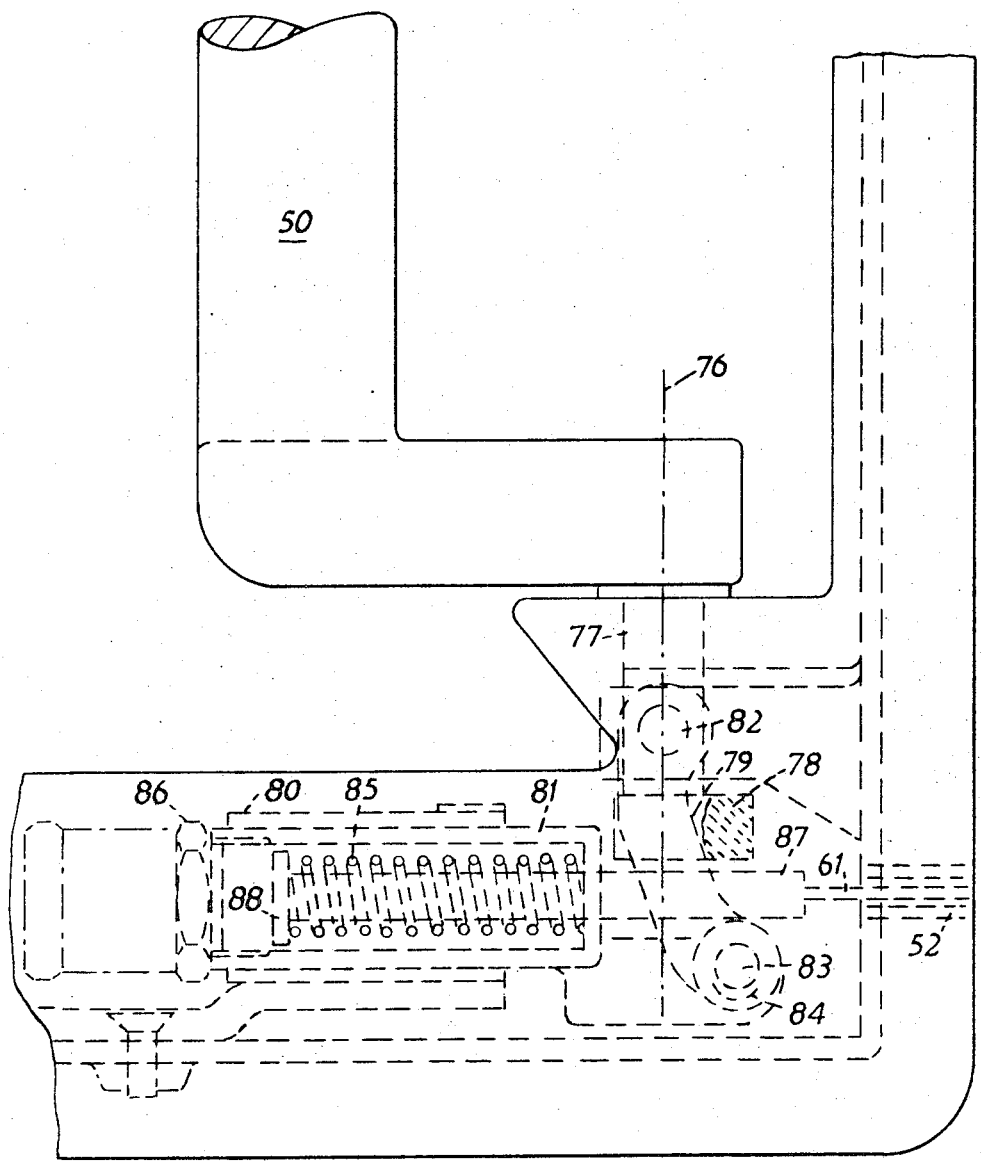
FIG. 13 shows details of a handle for use with the door shown in FIG. 8.

In FIG. 13, the partially illustrated outside door handle 50 is housed about a vertical pin 76 so that it can be turned and has its own terminal stop. The torsional moment exerted on the handle is transmitted through a pivot pin 77, a cam 78 and a lever 79, to a sleeve 81 which is housed in a bush in such a way that it is moveable. Lever 79 is housed at the top end around a pin 82, so that it can be turned, and at the bottom end is led across a bolt 83 in a slot. A pre-tensioned spiral spring 85 is fitted in sleeve 81. The pre-tensioning is produced by a screw 86. A perforated rod 87 fills the inside space of spring 85 and sticks out through an opening in the bottom of sleeve 81. The traction cable 61 on the Bowden cable, 52, is passed through the hole of rod 87. The end of the cable is attached to a disc 88.

If the door, when the handle 50 is operated, is released for opening, parts 81, 85, 86, 87 and 88 move as a result of the turning of the lever 79, around the pin 82, together towards the left into the position indicated with a dash-and dot line.

If, however, the door remains closed, then only sleeve 81 with screw 86 moves towards the left as far as the terminal position. The movement of parts 61, 87 and 88 is, however, limited by the engaging of coupling 68 (FIG. 9). At the same time the spiral spring 85, which operates as an overload safety device, is compressed. The spring pre-tensioning can be selected so high, for example at 20 Kp, that on the one side the door can be unlocked quite normally, whilst on the other side with arrest shaft 56, the Bowden cable, 52, the cam carrier 60, the cam 64 and the locking or closing electromagnet 57 cannot be damaged.

Swinging, sliding doors of the type described, are normally opened and closed by means of compressed air cylinders. Therefore, on operating the inside or outside door handle, the passenger simply exerts the force required for unlocking or opening the door. With the unlocking procedure, a compressed air valve must therefore be operated, desirably formed as a magnetic valve. The release coil of the valve can be wired or switched in parallel with the coil of the electro-magnet 57. Since the pressure in the cylinder builds up with a certain delay, the force for opening the door will not become effective before its unlocking.

The locking device described consists of a few parts which can be pre-assembled, namely the two door handles, the two controls and the shaft.

For assembly and operational reliability, it is better that all the electrical components be arranged outside the door panel in the body.

Within the framework of the invention, several deviations from the example illustrated can be produced. For instance, shaft 56 could also be locked pneumatically or hydraulically. In addition, it would be quite easy to replace the Bowden cables by other parts for the transmission of the forces. The contacts or switches 67 can also be quite easily used to indicate optically at the central position which door handles are being operated at any particular time.

If the door panel and the bodywork in the vicinity of the door are curved, universal joints can be fitted to shaft 56.

In the case of very wide doors, it is advisable under certain circumstances to provide further locking bolts at the top and bottom edges of the door, which would be driven from shaft 56 through universal joints or bevel gears.

Figure 14:
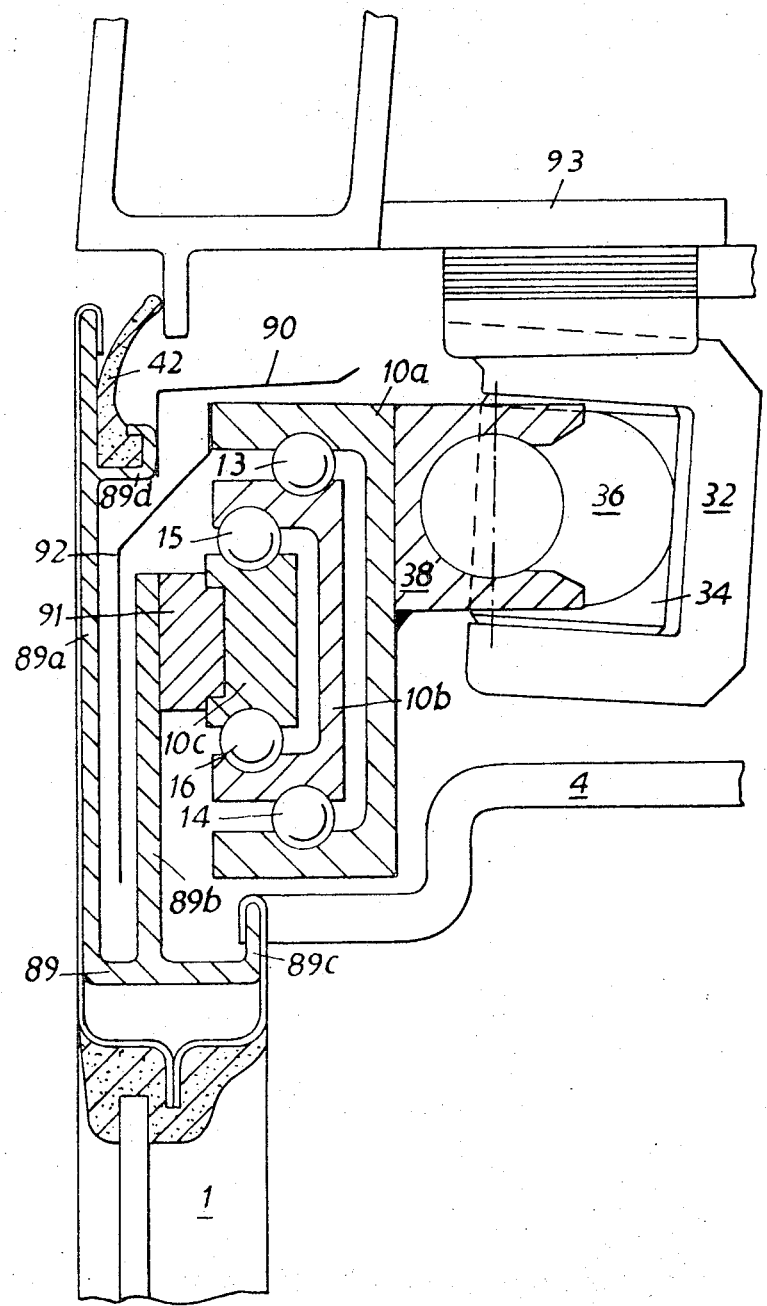
FIG. 14 is a vertical section through a further embodiment of a telescopic guide for use in a door according to the invention.

As shown in FIG. 14, the door panel 1 may be cut in the region of the window, in the top edge of which a pocket-shaped hollow section 89 is installed, and opened downwards. This profile or section 89 consists of a long, outside flank 89a, a shorter, inside flank 89b and an angle-shaped attachment 89c. The outer flank 89a has, at the top, a carrying channel 89d, which takes a sealing profile 42. An essentially horizontal masking skirt 90 is connected to the carrying channel 89d.

The inside profile 10c of the telescopic guide 10 is connected via an intermediate track 91 with the inside flank 89b of hollow section 89. At the top flank of the outside profile 10a of the telescopic guide, an essentially vertical masking skirt 92 is attached, which projects into the pocket-shaped hollow space between the section or profile parts 89a and 89b.

Masking skirts 90 and 92 protect the parts of the telescopic guide which are drawn out and those which are not drawn out from rain and dust, when the door is opened. As a result of this, the life of bearings 13 and 16 and the corresponding sliding surfaces are essentially lengthened; in addition these masking skirts also represent a contact safety device.

It can further be seen from FIG. 14 that a ball socket 38 for a parallelogram-guide 36 is attached laterally to the outside profile 10a of the telescopic guide. This makes it possible to keep the construction height of the door guide small. 34 indicates a bolt carrying the parallelogram-guide 36 which is housed in a stirrup 32. This stirrup is connected to the lid construction 93. An angle bracket 4, the angled or offset end of which is connected to profile part 89c, carries a guide roller at its right hand end, which is not illustrated.

Figure 15:
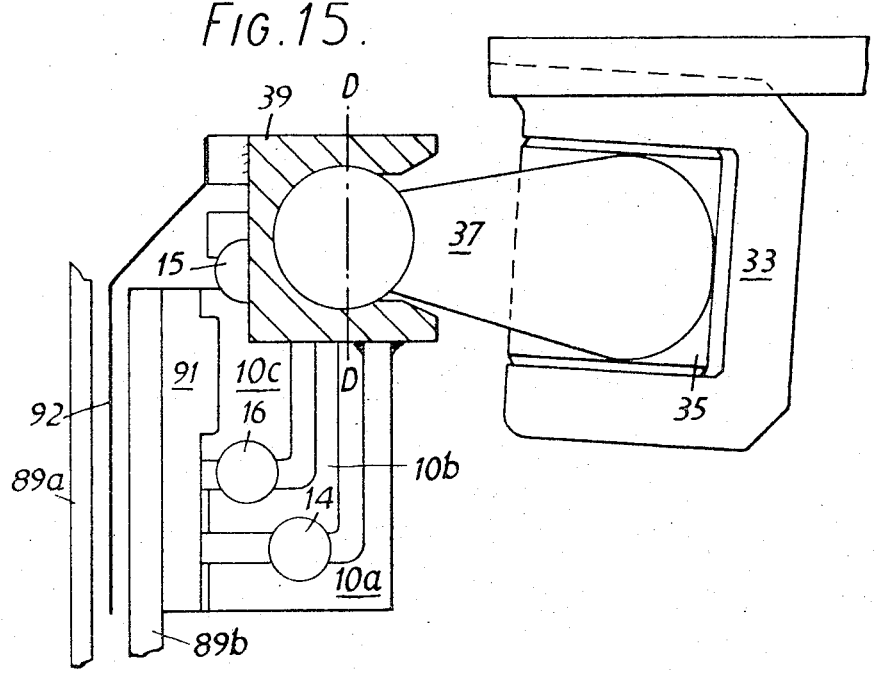
FIG. 15 is a side elevation of the guide shown in FIG. 14.

FIG. 15 shows the end of the telescopic guide opposite to the direction of withdrawal. 39 indicates the second ball socket, 37 the second parallelogram-guide, 35 the corresponding bolt, and 33 the bearing bracket. The ball socket is partially built into the telescopic guide and welded to its outside profile 10a. The advantage of this is that the axis of swing D—D passing through the ball socket, lies nearer the surface of the bearing balls 15 and 16. The result of this is that the tipping moment exercised on the guide tracks, which are not illustrated, as a result of the weight of the door, is reduced. The parallelogram-guide 37 is made longer, by the size of the displacement of the ball socket, than guide 36 on FIG. 14.

Figures 16, 17:
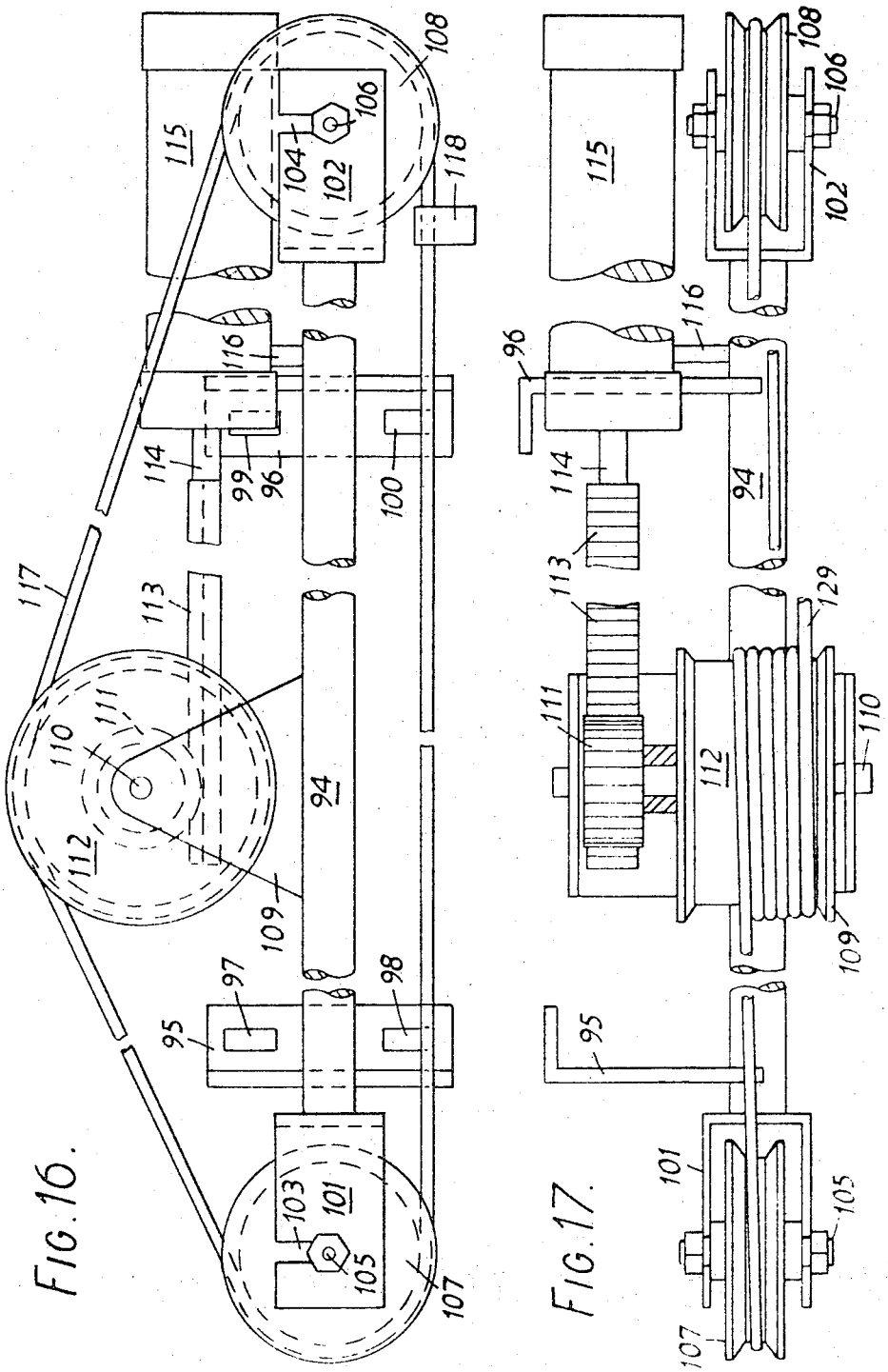
FIG. 16 shows a new type of pushing arrangement from the side for use in a further embodiment of a door according to the invention.
FIG. 17 is a plan view of the arrangement shown in FIG. 16.

Reference will now be made to FIG. 16 of the drawings which shows a hollow section support 94 consisting of a steel pipe with circular cross section. Two attachment angle brackets 95 and 96 are welded to this hollows section support 94. Each bracket 95, 96 has two slots, 97 and 98, 99 and 100 respectively for attachment to the bodywork. U-shaped brackets, 101 and 102, which are provided with slots 103 and 104 are welded to the ends of the hollow section support 94. Roller pins 105 and 106 carrying respective guide rollers 107 and 108 are screwed respectively into the slots 103 and 104.

In addition, a bearing bracket 109 is welded to the hollow profile support 94, and carries a spindle 110. On this spindle, a small gear wheel 111 and a substantially larger tension medium wheel 112, are fitted, so as to be rotatable. Both wheels are permanently connected together. Gear wheel 111 is driven by a rack 113, which is fitted to the piston rod 114 of a pressure medium cylinder 115.

The bilaterally stressable pressure medium cylinder 115 is connected with the hollow profile support 94 through a fish plate 116 in such a way, that its righthand end terminates approximately with the outer edge of guide roller 108.

The transmission ratio of the gear formed by wheels 111 and 112 is about 2.5 : 1 to 30 : 1. A tension medium 117, preferably a cable, is coiled several times around tension medium wheel 112 and led over guide rollers 107 and 108. Cable 117 is clamped fast to one point on the tension wheel 112, to prevent slipping. A driver 118, which drives the door, is secured to a portion of the cable 117.

FIG. 17 is a plan view the drive system shown in FIG. 16 and shows that the tension medium wheel 112 is formed practically as a cable drum.

The position illustrated in FIGS. 16 and 17 corresponds to the closed door. Piston rod 114 is fully inside the pressure medium cylinder. If the right hand chamber of the pressure medium cylinder 115 is loaded with pressure medium, preferably compressed air, then rack 113 moves towards the left which, at the same time, turns wheels 111, 112 and rollers 107 and 108 clockwise. The door is driven by driver 118 from the right to the left in the direction of opening.

In the case of a preferred version, a plate, which is not illustrated, is attached to the hollow profile support, which takes the control valve for the pressure medium cylinder.

Rack 113 could also be housed sideways from cylinder 115 over a U-shaped connection member.

The whole drive system can, as a result of the transmission, be dimensioned in such a width, that it can be pre-mounted above the door opening in the bodywork, without in any way affecting the formation of the door pillar.

Figure 18:
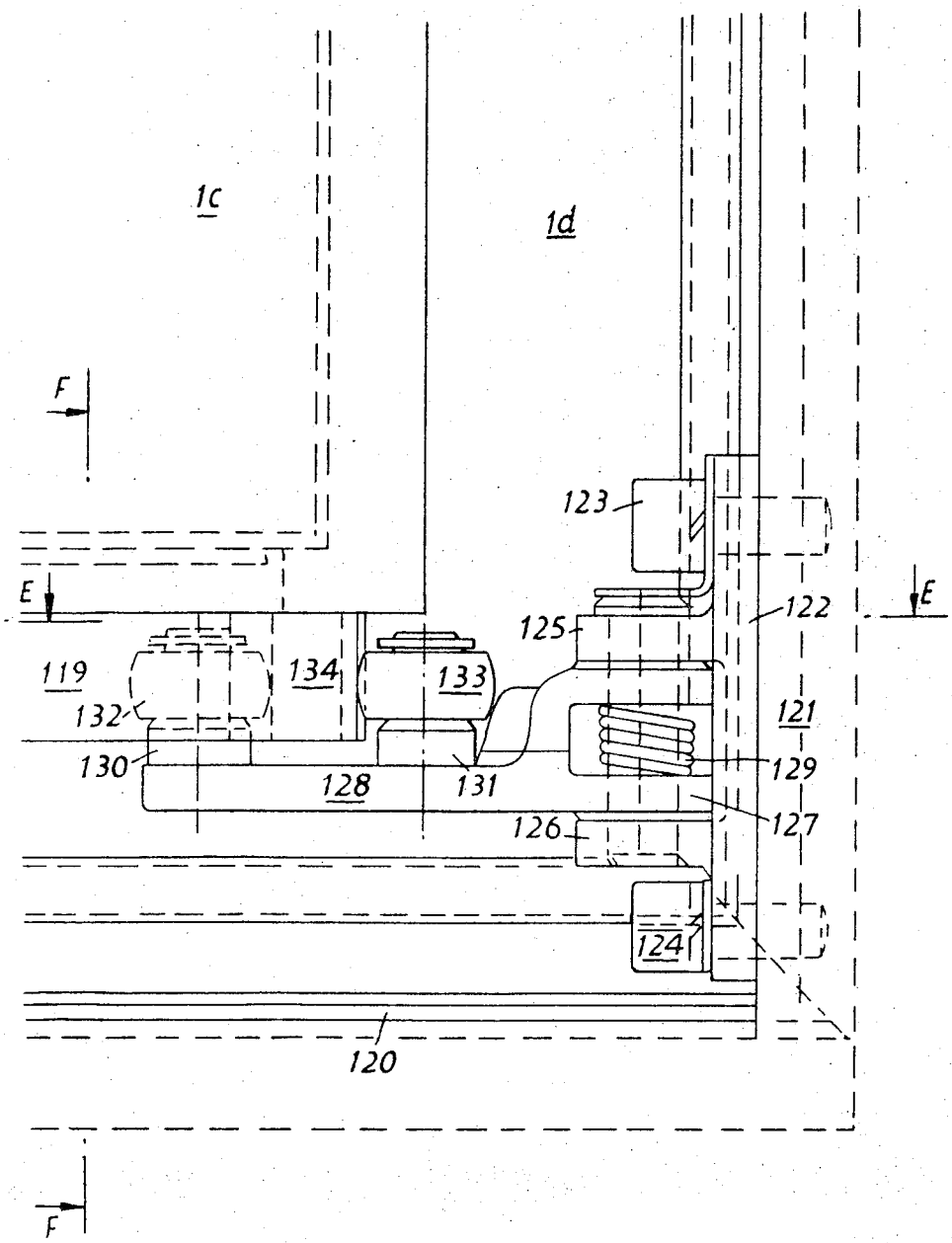
FIG. 18 is a side view of a new type of guide arrangement for a door according to the invention.

In the embodiment shown in FIG. 18, 1c indicates the inside and 1d the outside door cover sheet or plate. At the bottom end of the inside door cover sheet 1c an angle-shaped guide track 119 is attached in such a way, that its vertical flank lays about in the plane of the inside door cover sheet 1c. A door pillar 121 extends from the vehicle floor 120 and a bearing plate 122 is secured to the door pillar by fastening screws 123 and 124. A vertical pin 127 held in bearing blocks 125 and 126 carries a lever 128 which can be rotated to a limited extent. A spring 129 is arranged between bearing plate and lever. The lever 128 has two vertical pin bolts, 130 and 131, which carry guide rollers 132 and 133.

The guide track 119 is bent backwards at the right hand end around an assumed vertical pin and provided with an elastic insert 134 in this area as shown in FIG. 18.

The illustration of the parts in FIG. 18 corresponds to the closed position of the door. In this position, the roller 132 lying behind guide track 119 is supported against the elastic insert 134, whilst roller 133 rests on the curved area of the track.

Figure 19:
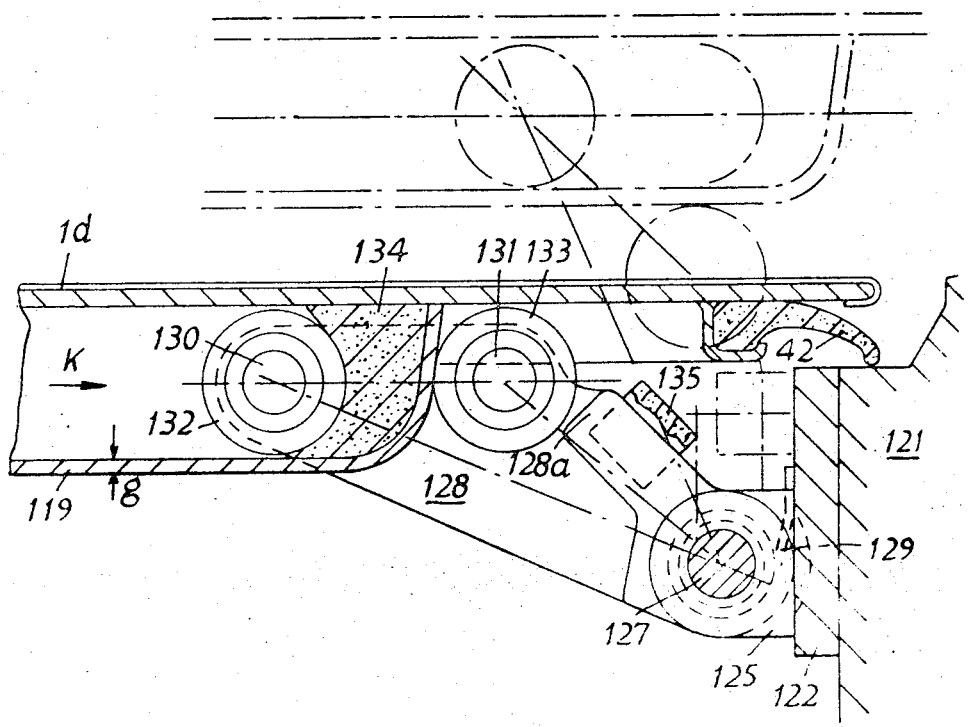
FIG. 19 is a cross section taken on the line E—E in FIG. 18.

Further detail can be seen from FIG. 19, which illustrates a cross section on the line E—E in FIG. 18. As shown in FIG. 19, pins 127, 130 and 131 are arranged in the corners of an obtuse-angled triangle and the connection line of pins 130 and 131 is parallel to the door surface, when the door is closed. Lever 128 is provided with a projection 128a, which, in the second terminal position of the lever, strikes against bearing plate 122. To dampen the impact, the projection 128a is provided with an elastic lining 135. The right hand edge of the door has a sealing section 42, which lies against the door pillar 121.

The position of the parts when the door is swung out and slid towards the right around a small area is indicated with dot-and-dash lines in FIG. 19.

If a force is applied to the door in the direction of the arrow K, a clockwise turning moment occurs on lever 128. This turning moment causes roller 133 to travel around the curved area of guide track 119, whereby every point of the door moves clockwise on a circular path, until lever 128 has reached its right hand terminal position. The door is then slid parallel to itself. Since the angle between the door surface and the connecting line of pins 127 and 130 is smaller than 45°, the door is swung very steeply out of the bodywork. The angle of curvature of guide track 119 is not quite 90°, so that, on shutting the door, there occurs between rollers 132 and 133, of the elastic insert 134 and guide track 119 a wedge effect, which prevents the door shaking in the direction of its surface. Since forces operating vertically on the door panel, for example, acceleration forces, cannot be completely absorbed by the guide system, the door panel is magnetically locked in the closed position.

The shortest distance between the circumference of rollers 132 and 133 is essentially greater than the thickness g of guide track 119. This distance, the radium of curvature of track 119 and the size of the elastic insert 134 are adjusted in relation to each other in such a way that track 119 is always held between rollers 132 and 133 in every movement phase. The elastic insert damps the terminal phase of the door movement on closing.

The spring acting on lever 128, which is formed as a casting, is not necessary in every case. It can be made in such a way that it supports the movement of lever 128 either during closing or during opening of the door. The choice of the spring depends on the kinematic behavior of the guide system, which in turn is initially determined by the spacing of the rollers 132 and 133 and the radius of curvature of the guide track 119. This radius can correspond approximately to the radius of guide rollers 132 and 133.

Figure 20:
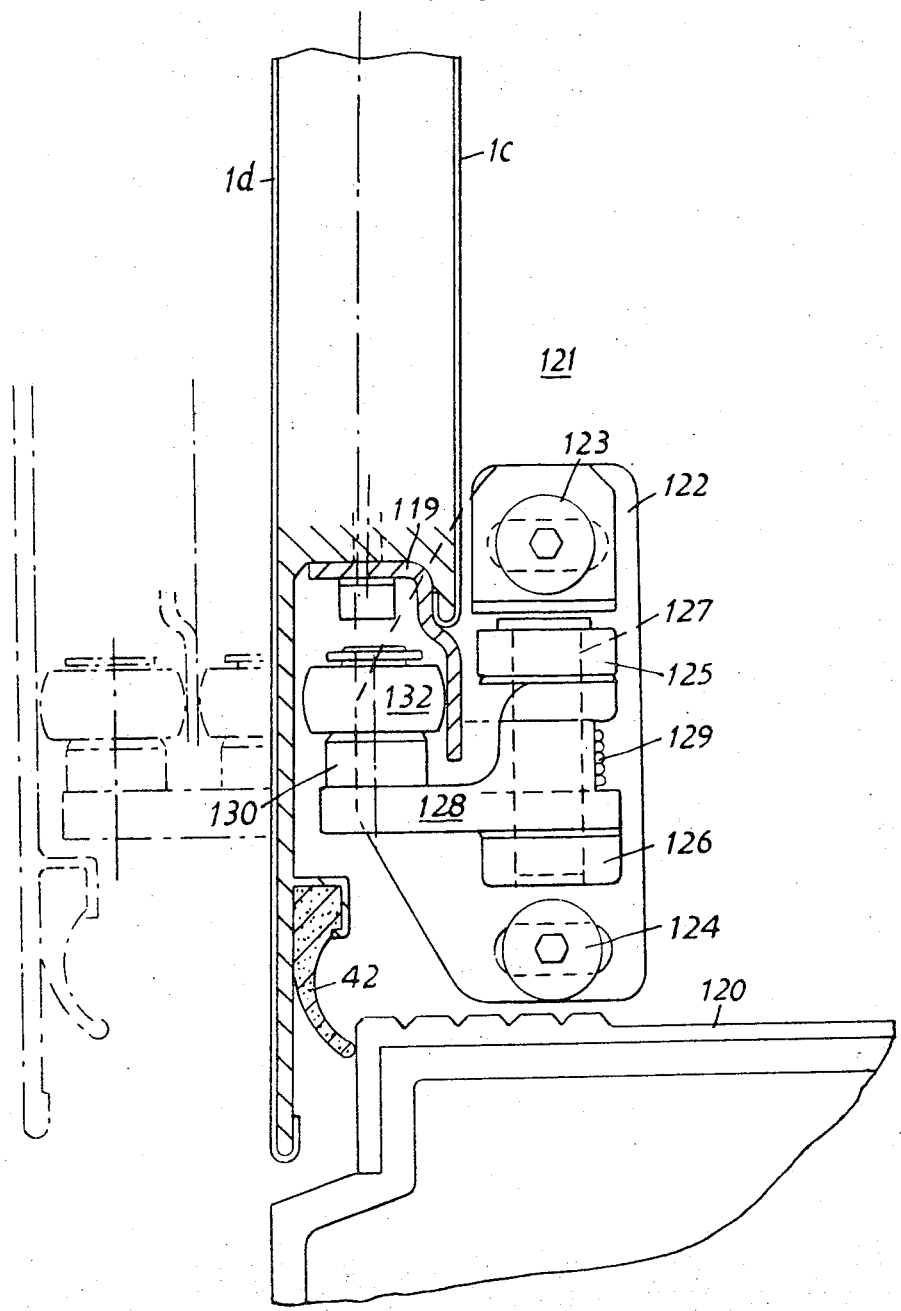
FIG. 20 is a vertical section taken on the line F—F in FIG. 18.

FIG. 20 shows a vertical section on the line F-F in FIG. 18. In particular the position of guide rod 119 within the door profile and the formation of the vehicle floor 120 in the vicinity of the bottom edge of the door can be seen. The sealing profile 42 is formed as a circular profile. On account of the steep manner in which the door swings out, this seal lifts off without a rubbing or grinding movement, which is favorable to its life.

FIG. 20 further shows that the angle-shaped guide track 119, the horizontal flank of which is connected to the door, and the vertical flank of which lies in a plane with the door cover sheet 1c, fits optically very well into the door design.

The position of the parts when the door is swung out is shown with dash-and-dot lines.

A similar type of guide system can also be fitted to the top edge of a swinging, sliding door. In addition the design is just as suitable for double-sided swinging, sliding doors, as for unilateral doors.

The main advantage of the system described can be seen in the fact that the formation of the body in the vicinity of the entry step and also in the vicinity of the top of the door, is in no way affected.

The guide rod fitted to the door has, despite its curved area, no greater construction depth than is normally customary for the door. In the case of the stationary guide rods however, the curved part must be so long that the construction depth of the track is many times the construction depth of the door, which renders difficult the installation of these tracks in the bodywork.

Figure 21:
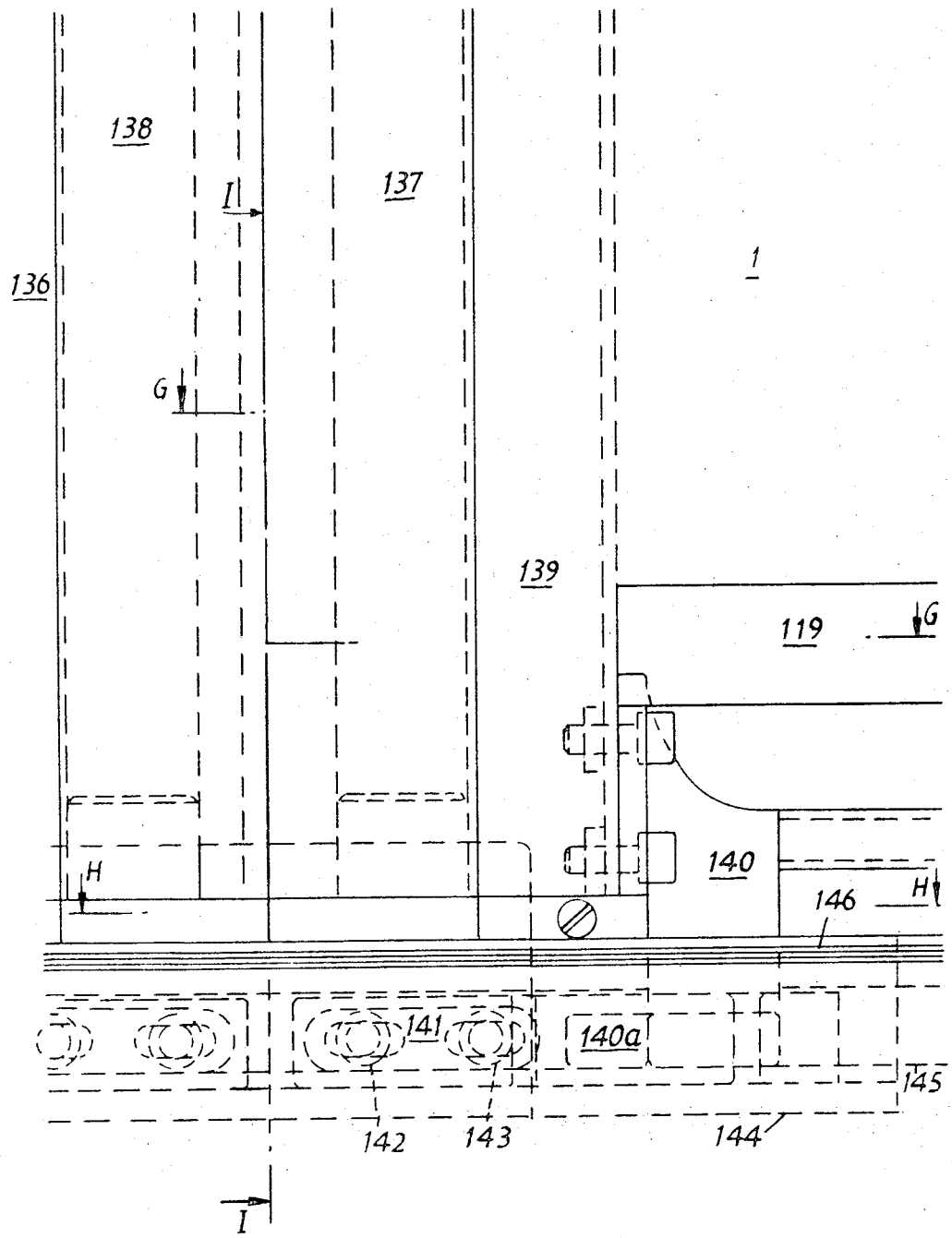
FIG. 21 is a cutaway view of a double sided swinging, sliding door according to a further embodiment of the invention viewed from inside.

In FIG. 21, two door panels are shown, the right hand panel being denoted 1 and the left hand panel being denoted 136. Both door panels, illustrated only in outline, are provided with finger protection profiles 137 and 138, which come together on the line I—I. To the frame profile 139 of the inside edge of the right hand door panel 1, a door wedge 140 in the form of an anglepiece is fastened with two screws, the wedge area 140a of which grips behind a short plastics projection 141 provided with slots. This short projection is fastened with screws 142 and 143 in a support body 144, provided with a pocket. The support body 144 is positively welded into a cut-out of the floor support 145. FIG. 21 also shows the edge 146 of an entry step.

Figure 22:
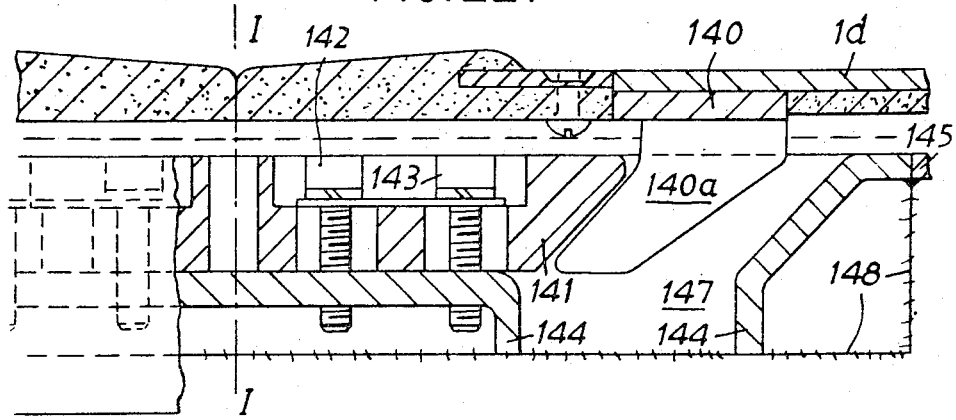
FIG. 22 is a cross section taken on the line H—H in FIG.21.

The arrangement of the parts 140 – 145 can be clearly seen from FIG. 22 which shows the shape of the door wedge 140, 140a and the short projection 144. An oblique pocket 147, which is open rearwards, is provided in support body 144, into which door wedge 140 moves when the door is closed. The rearwards opening of the pocket 147 prevents it being stopped up by dirt and snow. The support body 144 is connected to the floor support 145 by a welding seam 148 in such a way that the static loading capacity of this support is not essentially reduced.

A second catch device for the left hand door panel is arranged to the left of the line I—I. Both catch devices have a common support body 144 and separate projection for the door wedges.

Figure 23:
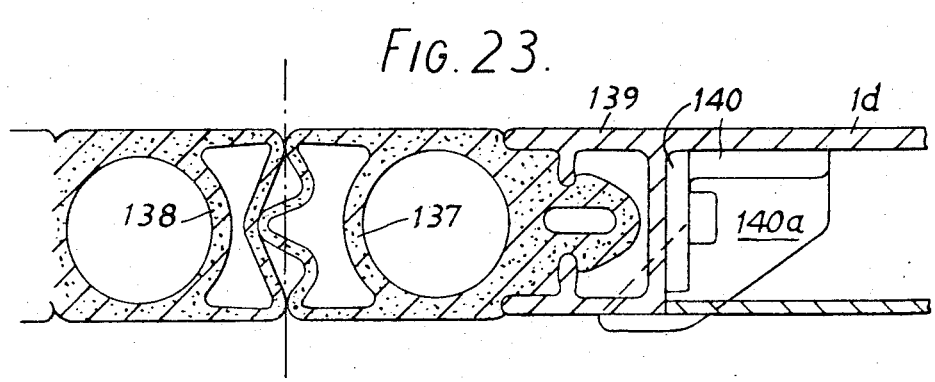
FIG. 23 is a cross section taken on the line G—G in FIG.21.

FIG. 23 shows the construction of the door frame profile 139, the finger protection profiles 137 and 138 and the position of the door wedge 140, 140a, relative to the profile of the door panel 1. The door wedge only projects very slightly out of the inside door panel surface.

Figure 24:
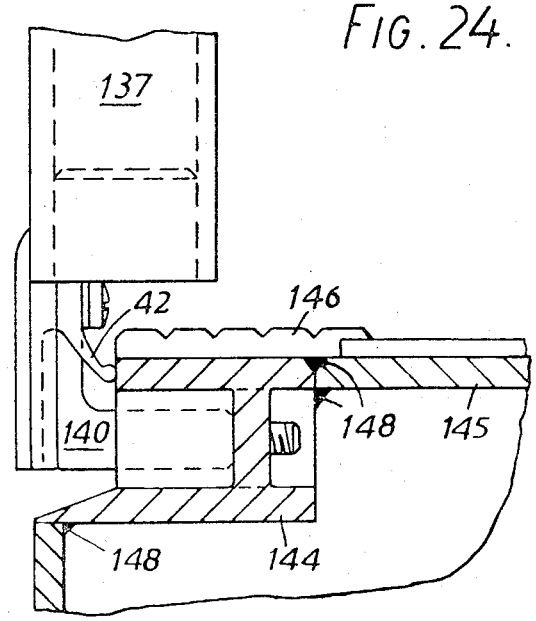
FIG. 24 is a longitudinal section taken on the line I—I in FIG.21.

FIG. 24 shows the door sealing profile 42 which can be taken around three edges of the door and that the formation of the entry step edge 146 is independent of the installation of the catch device for the door. The interchangeable parts of the catch device are arranged so as to be easily accessible from the outside.

It will be understood that the above description of the present invention is susceptible to various modifications changes and adaptations.

We claim:

1. In a swinging sliding door suspension for vehicles, said door including at least one door panel, comprising: a single telescopic guide which has approximately the width of the door panel and which bears the weight of the door panel in the open state of the door, said telescopic guide including a plurality of profiled rails; a plurality of parallelogram guides mounted to the vehicle body, said telescopic guide having one side mounted to said door panel and one side mounted to said parallelogram guides, said telescopic guide being disposed at the upper edge of said door panel; and further guide means fixed to the vehicle body for guiding the door panel, the improvement comprising two guides fixed to the vehicle body to guide the door panel, wherein the telescopic guide comprises three profiled guide rails including two C-profiled guide rails which enclose an O-profiled guide rail with means disposed between said rails for reducing the level of friction developed, the two innermost profiled guide rails each extending to a midpoint of its length when the door is in its open state, wherein said parallelogram guides have means defining stationary axes of rotation which are connected to the vehicle body and pivot means which are connected to said telescopic guide, said stationary means being inclined slightly outwardly with respect to the perpendicular axis of the vehicle body, wherein one of said parallelogram guides is connected to the door panel near a front edge thereof and the other parallelogram guide is connected to the door panel near a rear edge thereof, said front edge parallelogram guide being longer than said rear edge parallelogram guide, wherein the perpendicular distance between a line normal to said stationary axes of rotation and lines parallel to said normal line and passing through said pivot means which are connected to said telescopic guide is greater for said front edge parallelogram guide than for said rear edge parallelogram guide, wherein said pivot means which are connected to said telescopic guides are each provided with a spherical head which moves in a circular path, and wherein said telescopic guide is provided with ball sockets fastened to the upper side of said telescopic guide within each of which a respective spherical head rests.

2. The improvement as defined in claim 1, wherein the door panel is a dual-wall panel, and wherein said telescopic guide is disposed at least partially within the dual-wall door panel.

3. The improvement as defined in claim 1, further comprising a catch disposed at a lower corner of the door panel adjacent a wall of the vehicle body, said catch holding the door panel when the door is closed.

4. The improvement as defined in claim 1, wherein said friction reducing means are balls moving between the profiled guide rails.

5. The improvement as defined in claim 1, wherein said friction reducing means are slide layers of polytetrafluoroethylene.

6. The improvement as defined in claim 1, wherein said ball sockets are provided with a lateral keyhole-type recess for insertion of said spherical heads and screw means for retaining said spherical heads in said ball sockets.

7. The improvement as defined in claim 1, wherein the upper of said two guides forms a pre-assembled unit with said parallelogram guides.

8. The improvement as defined in claim 1, wherein the ball sockets are fastened to the upper side of said outer profiled guide rail so that they are disposed in the door panel profile and above said balls and the center of gravity of the door.

9. In a swinging sliding door suspension for vehicles, said door including at least one door panel, comprising: a single telescopic guide which has approximately the width of the door panel and which bears the weight of the door panel in the open state of the door, said telescopic guide including a plurality of profiled rails; a plurality of parallelogram guides mounted to the vehicle body, said telescopic guide having one side mounted to said door panel and one side mounted to said parallelogram guides, said telescopic guide being disposed at the upper edge of said door panel; and further guide means fixed to the vehicle body for guiding the door panel, the improvement comprising two guides fixed to the vehicle body to guide the door panel, wherein the telescopic guide comprises three profiled guide rails including two C-profiled guide rails which enclose an O-profiled guide rail with means disposed between said rails for reducing the level of friction developed, the two innermost profiled guide rails each extending to a midpoint of its length when the door it is its open state, and wherein the suspension further comprises an upwardly open pocket-shaped hollow profiled section installed in the upper edge of the door panel, said section including an inner arm which is connected with said O-profiled guide rail, and a covering apron fastened at the upper end of said outer C-profiled guide rail which extends into the hollow profiled section.

10. The improvement as defined in claim 9, further comprising an inwardly directed horizontal covering apron fastened to an outer arm of said pocket-shaped hollow profiled section.

* * * * *